US011334868B2

(12) United States Patent
Phillips et al.

(10) Patent No.: US 11,334,868 B2
(45) Date of Patent: *May 17, 2022

(54) VARIABLE DEPOSITS MAXIMUMS FOR A DIGITAL CASH DEPOSIT DIGITIZATION SERVICE

(71) Applicant: Capital One Services, LLC, McLean, VA (US)

(72) Inventors: Jeremy Phillips, Brooklyn, NY (US); Kevin Park, Little Neck, NY (US); Thomas Dodson, Forest Hills, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/084,255

(22) Filed: Oct. 29, 2020

(65) Prior Publication Data

US 2021/0049581 A1 Feb. 18, 2021

Related U.S. Application Data

(63) Continuation of application No. 16/678,200, filed on Nov. 8, 2019, now Pat. No. 10,853,792, which is a continuation of application No. 16/515,004, filed on Jul. 17, 2019, now Pat. No. 10,510,069.

(51) Int. Cl.
*G06Q 20/32* (2012.01)
*G07F 19/00* (2006.01)
*G06Q 20/20* (2012.01)
*G06Q 20/40* (2012.01)

(52) U.S. Cl.
CPC ....... *G06Q 20/3274* (2013.01); *G06Q 20/204* (2013.01); *G06Q 20/3224* (2013.01); *G06Q 20/4014* (2013.01); *G07F 19/202* (2013.01)

(58) Field of Classification Search
CPC ............. G06Q 20/3274; G06Q 20/204; G06Q 20/3224; G06Q 20/4014; G07F 19/202
USPC ....................................... 235/379
See application file for complete search history.

(56) References Cited

U.S. PATENT DOCUMENTS

| 8,146,805 | B1 * | 4/2012 | Davis | G06Q 20/385 |
| | | | | 235/379 |
| 8,554,671 | B2 * | 10/2013 | Ballout | G06Q 30/02 |
| | | | | 705/39 |
| 9,010,627 | B1 * | 4/2015 | Prasad | G06Q 20/202 |
| | | | | 235/379 |
| 9,230,251 | B1 * | 1/2016 | Vijayvergia | G06Q 20/10 |
| 9,761,090 | B2 * | 9/2017 | Bosch | G07F 19/202 |
| 10,163,091 | B1 * | 12/2018 | Vijayvergia | G06Q 20/28 |
| 10,510,069 | B1 * | 12/2019 | Phillips | G06Q 20/3224 |

(Continued)

*Primary Examiner* — Paultep Savusdiphol
(74) *Attorney, Agent, or Firm* — KDB Firm PLLC

(57) ABSTRACT

A system and method are disclosed in which cash deposits may be made at merchant locations who support such deposits. Using a mobile phone or other hand-held device, a bank customer requests a cash deposit from a banking app, receives a barcode on the mobile device, the barcode containing embedded information indicating the cash deposit amount, and presents the barcode to the merchant, along with the cash to be deposited. Once the transaction with the merchant is complete, the account of the bank customer's account is credited with the cash amount. The bank uses behavioral and historical data of the bank customer to customize a cash deposit limit for the customer.

20 Claims, 6 Drawing Sheets

(56) References Cited

U.S. PATENT DOCUMENTS

| | | | | |
|---|---|---|---|---|
| 10,853,792 B1* | 12/2020 | Phillips | ............... | G06Q 20/3223 |
| 2007/0100750 A1* | 5/2007 | Hartfield | ................. | G07F 19/20 |
| | | | | 705/43 |
| 2013/0240622 A1* | 9/2013 | Zhou | .................... | G06Q 20/425 |
| | | | | 235/379 |
| 2014/0330656 A1* | 11/2014 | Zhou | ..................... | H04W 12/06 |
| | | | | 705/16 |
| 2015/0227913 A1* | 8/2015 | Bailout | .................. | G06Q 20/04 |
| | | | | 705/42 |
| 2016/0078416 A1* | 3/2016 | DeLuca | ................ | H04W 4/021 |
| | | | | 705/43 |
| 2016/0078417 A1* | 3/2016 | DeLuca | ................. | G07F 19/20 |
| | | | | 701/23 |
| 2016/0371659 A1* | 12/2016 | Berry | ................... | G06Q 20/202 |
| 2017/0011599 A1* | 1/2017 | Bosch | ....................... | G07F 7/10 |
| 2018/0053173 A1* | 2/2018 | Ballout | ................. | G06Q 20/04 |
| 2018/0336538 A1* | 11/2018 | Cantley | ................ | G06Q 20/027 |

\* cited by examiner

Figure 2    cash deposit digitization method (200)

200

300

400

VARIABLE DEPOSITS MAXIMUMS FOR A DIGITAL CASH DEPOSIT DIGITIZATION SERVICE

RELATED APPLICATIONS

This application is a continuation of U.S. patent application Ser. No. 16/678,200, filed on Nov. 8, 2019, which is a continuation of U.S. patent application Ser. No. 16/515,004, filed on Jul. 17, 2019, now U.S. Pat. No. 10,510,069. The contents of the aforementioned U.S. patent and patent applications are incorporated herein by reference.

BACKGROUND

Bank customers like the convenience of Automated Teller Machines (ATMs). ATMs allow customers to obtain information about their bank account, such as account balances, and also enable cash deposits and withdrawals to be made 24-hours a day. ATMs may be located inside a bank or on its premises, in convenience and grocery stores, and in malls, airports, and sports arenas. Free-standing ATMs not associated with any one business may also be found in some locations.

In some communities, though, ATMs are difficult to find. Because they are often associated with businesses, ATMs are harder to find in some suburban communities in which there is not much commerce. Those living in rural communities may have to travel far to find an ATM. For those customers, ATMs are not so convenient.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

Figure 1:
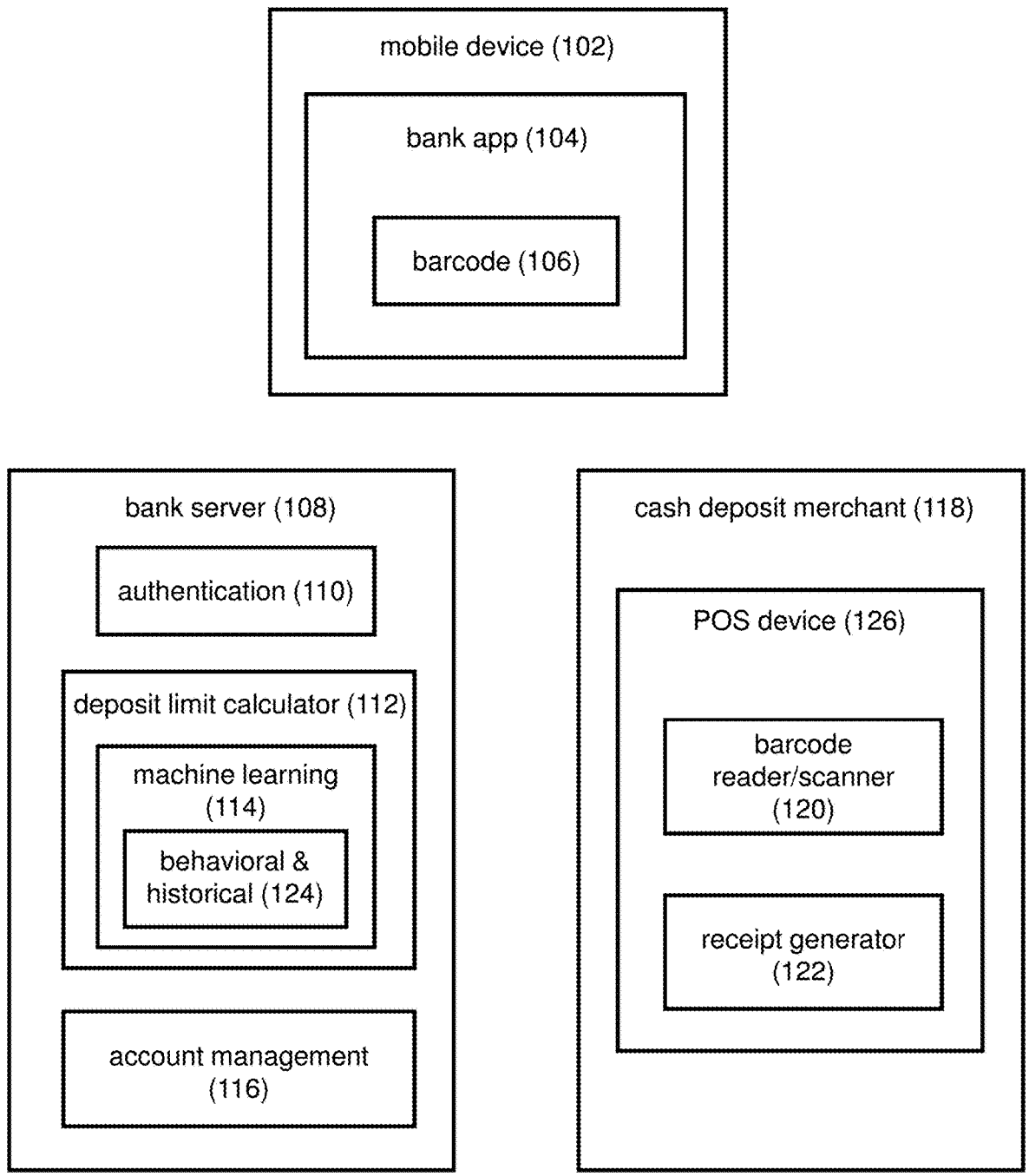
FIG. 1 is a simplified block diagram of a cash deposit digitization system, according to some embodiments.

In accordance with the embodiments described herein, a system and method are disclosed in which cash deposits may be made at merchant locations who support such deposits. Using a mobile phone or other hand-held device, a bank customer requests a cash deposit from a banking app, receives a barcode on the mobile device, the barcode containing embedded information indicating the cash deposit, and presents the barcode to the merchant premises, along with the cash to be deposited. Once the transaction with the merchant is complete, the account of the bank customer's account is credited with the cash amount. The bank uses behavioral and historical data of the bank customer to customize a cash deposit limit for the customer.

Evolution of the Banking Relationship

Banks and other financial institutions provide a number of different services involving finances, most notably, a checking or savings account. Hereinafter, a reference to a "bank" is meant to encompass other financial institutions, including, but not limited to credit unions, savings and loan institutions, financial services providers, and so forth. Initially, a customer of a bank would rely on a passbook, a booklet issued by the bank, enabling the accountholder to personally record how much money had been deposited or withdrawn from the account. More recently, an accountholder would receive a statement, usually monthly, in the mail.

With the advent of personal computers, banks began providing account statements by electronic mail for those users who selected the feature, such as being part of the institution's "paperless" option. Today, many banks enable customers to access their account information by way of a personal computer, laptop, tablet, notebook, pad, personal digital assistant, or other devices that have access to the Internet. By accessing a web page and providing a username and password as authentication, the user is able to receive a wealth of information about the bank account, including recent purchases and deposits, transaction entities, bank statements, and so on. These web accesses also enable transactions to take place, known colloquially as "online banking" in which automatic payments may be scheduled and money may be transferred between different accounts of the user, to a third-party account within the same bank, and even to third-party accounts with another bank. Relying on this Internet-based access, today's accountholder may view the current balance of an account twenty-four hours a day, seven days a week.

With the proliferation of hand-held device technology, such as smart phones, many banks have made applications (known colloquially as "apps") available to their customers. As long as the smartphone is able to access the Internet, the bank may provide a downloadable app for accessing a customer's bank account from the smartphone. Similar to the web page, the app, once selected, will generally request a username and password to authenticate the user. Alternatively, some apps enable access using a fingerprint or voiceprint to authenticate the user. Once authenticated, the user is able to review the account, such as to obtain balance information, scroll through transactions, make transfers to another account, deposit checks, and so on. These apps are intended to enhance the convenience for the accountholder. So, in addition to being able to access one's checking account by accessing a web page, a user may similarly access the account by enabling the app on a smartphone or other hand-held device.

Cash Deposit Digitization

FIG. 1 is a simplified block diagram of a cash deposit digitization system 100, according to some embodiments. The cash deposit digitization system 100 consists of a mobile device, such as a cellphone, smartphone, or tablet, which is in communication with a bank server 108, and which is used to invoke a cash deposit at a cash deposit merchant 118. The cash deposit merchant 118, as used herein, is neither the bank affiliated with the bank server nor an ATM affiliated with any bank. Instead, the cash deposit merchant 118 is a store, examples of which include, but are not limited to, a drugstore, a grocery store, a convenience store, or any other business in which members of the public are invited to shop for goods or services offered by the business. The mobile device 102 communicates wirelessly with the bank server 108 by way of a bank app 104. The wireless communication may take place via the Internet, a local area network (LAN), a wide-area network (WAN), a wireless LAN (WLAN), a wireless WAN (WWAN), a proprietary network, and so on. The bank app 104 may be the same app used by a customer of the bank (and owner of the mobile device 102) to access the bank's web page. The customer (not shown) may also be referred to herein as bank customer, accountholder, and user.

The cash deposit digitization system 100 is digitizing the cash deposit by converting paper currency (the dollar bills being deposited) into available funds in the customer's bank account, which is displayed on the customer's mobile app or web login. The cash deposit, once digitized into an updated bank account balance, is further usable by digital banking features such as Automated Clearing House (ACH), wire transfers, Payee-to-Payee (P2P) payments, Bill Pay, and so on. A customer deposit of currency into an ATM is thus a digitization of the deposit.

The bank server 108, which may actually be more than one server, is controlled by a bank (not shown) and is communicatively coupled with the bank app 104 of the mobile device 102. The bank server 108 is a computing system of the bank, which may be on the premises of the bank, may be a cloud server, or may be a combination of on-premises and cloud-based computing. The bank server 108 includes software executed by a processor, the software including at least an authentication unit 110, a deposit limit calculator 112, and an account management unit 116. Upon logging into the bank app 104 by the customer, the authentication unit 110 confirms the credentials of the customer. At a minimum, the authentication unit 110 confirms the username and password as being correct. The authentication unit 110 further may include sending a one-time personal identification number (PIN) to a short messaging service (SMS), colloquially known as text messaging, of the customer's mobile device, or the one-time PIN may be sent to the customer's email address.

In some embodiments, the cash deposit digitization system 100 determines a bank customer's cash deposit limit in real-time and per customer. Thus, the deposit limit calculator 112 determines whether the cash deposit request made by the bank customer is within the cash deposit limit of the customer's bank account at the time the request is made. In some embodiments, the customer-specific cash deposit limit is obtained using machine learning 114 and based in part on behavioral and historical data 124 about the bank customer. The bank server 108 also includes account management 116, which credits the account of bank customer once the cash deposit is made.

With some limitations described in more detail below, upon requesting a cash deposit at the merchant 118, the bank app 104 displays a barcode 106, which contains embedded information that tells a barcode reader the cash deposit amount, allowing the bank customer to enter the merchant premises and complete the cash deposit transaction. The cash deposit merchant 118 includes a point-of-sale (POS) device 126, including at least a barcode scanner/reader 120 and a receipt generator 122, as well as software to interpret the barcode and cause issuance of the receipt. Optionally, the POS device 126 may also include a display or be coupled to a display. POS devices 126 are part of the cash registers of many merchant businesses. Once the barcode 106 is positioned in proximity to the POS device 126, the barcode scanner/reader 120 scans the barcode. Subsequently, an indication is made visible to the cashier, a human being, possibly via a display on the cash register or on the POS device 126, the amount of the deposit to be received from the bank customer. The cashier thus knows how much cash to accept from the bank customer to complete the deposit transaction.

In another example, the cash deposit merchant 118 includes a self-checkout POS device in which no human cashier interacts with the bank customer to complete the deposit. Instead, the barcode scanner/reader 120 of the POS device 126 scans the barcode, and the self-checkout POS device prompts the bank customer, such as via a display, to deposit the cash amount embedded in the barcode. In this example, the POS device may include a mechanism known as a cash validator for receiving the cash. The cash validator includes a treadmill-like path that pulls the bills in, one by one, and verifies each bill using an optical scanner and authentication software. Vending machines and Automated Teller Machines (ATMs) are among the devices that include cash validators. Thus, the cash deposit digitization system 100 and method 200 may operate with a human cashier or with a cash validator instead of a cashier.

The cash deposit merchant 118 is able to support the cash deposit digitization system 100 without adding new hardware or capability. From the merchant perspective, the cash deposit transaction of the bank customer will be similar to other transactions, such as loading money onto a gift card, at the merchant business. The cash deposit digitization system 100 may be used in virtually any modern business having a POS device with both a barcode reader/scanner and some mechanism to generate a receipt, whether printed on paper or transmitted electronically.

The cash deposit merchant 118 selection is controlled by the bank. In some embodiments, the bank will select the merchants based on factors such as whether there is a relationship between that bank and the merchant. For example, some banks are found inside grocery stores. The merchant grocery store may thus be a good candidate to operate as a cash deposit merchant. In some embodiments, the bank will select the merchant based on the commercial characteristics of a geographic region. For example, suppose there are three Walgreens in a small town in which a large percentage of the town's residents are customers of the bank. In that case, certifying the three Walgreens as merchants supporting cash deposits may be a popular choice. As another example, if a Walmart is the center of commerce in a rural community, allowing cash deposits at the Walmart may be well received by customers of a bank. A merchant that is capable of integrating quickly with a bank, has the ability to accept cash, generate a barcode for the customer to use, and provide enough information about the deposit to credit the customer's account quickly may also be a good candidate from the bank's perspective.

There are other reasons why the bank may select a particular merchant. In some embodiments, the bank will select the merchant based on the number of its customers working in the service industry in a particular geographic area. Or the bank may select merchants in regions of limited commerce, such as "food deserts". Regions with considerable 24-hour and weekend activity, such as near casinos and hotels, may benefit from judicious selection of cash deposit merchants. Regions where the bank has a large number of customers based on the home or business addresses known to the bank may also prompt the bank to select merchants in those regions. Or the bank may have a Locations Services feature on the bank customers' mobile apps, which indicate regions frequently visited by the customers. Such regions may also prompt the bank to select merchants in those regions. Regions where utilization of cash is high, such as restaurants, laundromats, and taxi services, may drive the bank's merchant selection. Analysis of the bank's business customer database may, for example, provide information about cash-driven businesses.

The cash deposit digitization system 100 is useful for bank customers who regularly obtain cash but have limited access to ATMs or banks. Individuals in the service industry, such as waiters and bartenders, are sometimes paid in cash and may be paid frequently, such as every day or every other day. By enabling bank customers to deposit cash quickly and conveniently to their bank account, the risks associated with carrying cash may be reduced.

Figure 2:
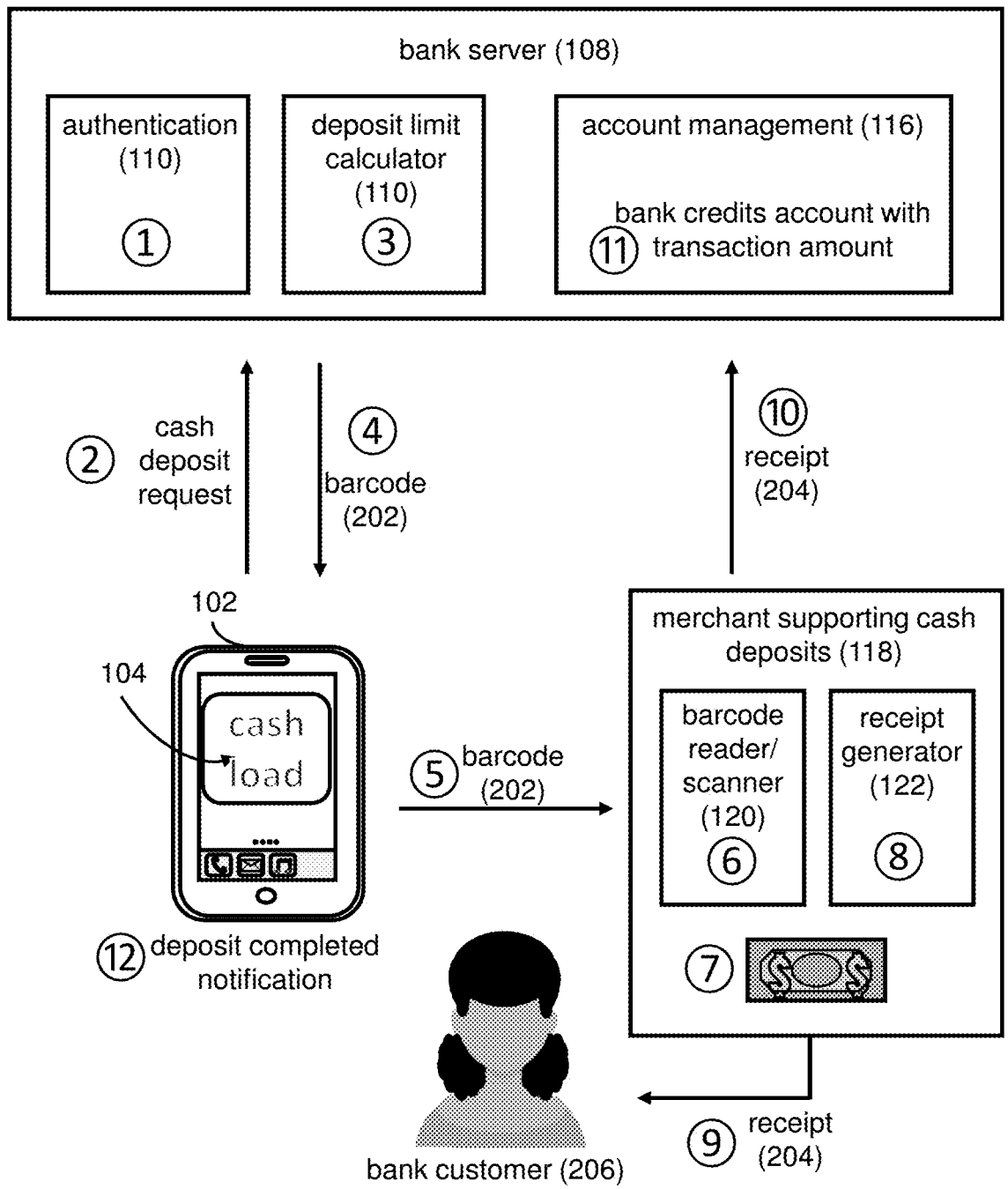
FIG. 2 is a simplified block diagram of a cash deposit digitization method, according to some embodiments.

FIG. 2 is a simplified block diagram of a cash deposit digitization method 200, according to some embodiments. The mobile device 102, bank server 108, and merchant supporting cash deposits 118 from the system 100 (FIG. 1) are shown, as is a bank customer 206 who has a relationship with the bank controlling the server. The operations of the cash deposit digitization method 200 are indicated numerically. The bank app 104 shows a "cash load" feature, but before the feature is invoked by the bank customer 206, the bank customer logs into the banking app on her mobile device 102. At the bank server 108, the authentication unit 110 authenticates the bank customer, by confirming the username and password and, optionally, by sending a one-time PIN, as described above (1).

Once authenticated, the bank customer 206 is able to initiate the cash deposit request (2) from her mobile device 102. This request is received at the bank server 108 and the deposit limit calculator 110 performs it analysis of whether the cash deposit amount is acceptable for this bank customer (3). This process is described in more detail in the flow diagram of FIG. 3, below. Once the deposit limit calculator 110 determines that the cash deposit request does not exceed the customer's deposit limit, a barcode 202 is issued (4), which will appear on the app 104 of the mobile device 102. In some embodiments, the bank customer is made aware of the real-time customer-specific deposit limit, as the limit also appears on the app, either along with the barcode or on a separate screen.

Once the bank customer 206 receives the barcode 202, she knows she may make a cash deposit at a supported merchant. So, she enters the premises of a merchant supporting cash deposits 118 with her barcode displayed on the mobile device (5). The merchant 118 reads the barcode 106 by scanning the barcode using the barcode scanner/reader 120 of the POS device 126 (6). In this manner, the cashier knows the amount of cash to accept from the customer. In other words, the cash is transferred from the custody of the bank customer 206 to the custody of the cashier at this point in the transaction (7). In another example, the cash is transferred, without the use of a cashier, to a device that receives, authenticates, and counts the cash, such as a cash validator.

Once the cash is received at the merchant premises, the POS device 126, using the receipt generator 122, generates a receipt 204 for the transaction (8). The receipt 204 may be in printed or electronic form, with the option to choose being electable by the bank customer in some examples. In electronic form, the receipt 204 may be sent to the mobile device 102 of the bank customer 206 or may be sent to an email address specified by the customer, as two examples. The bank customer 206 accepts the receipt 204 as proof of the transaction (9), whether printed on paper or in electronic form. The merchant then issues the receipt 204, in electronic form, to the bank server 108 (10), at which time the bank credits the bank customer's account with the amount of the cash deposit (11). Optionally, the bank app 104 may post a "deposit completed" notification (12) to the bank customer's mobile device, as further confirmation of transaction success.

In the cash deposit digitization method 200, the bank customer 206 is using a mobile device, such as a smartphone, and is initiating the cash deposit transaction from the mobile app loaded on the device. In some embodiments, the barcode may be opened on the mobile device once generated from the bank app on that same device. Further, the barcode is made available to the mobile device only after the customer has been authenticated through the username and password verification, followed by issuance of a one-time PIN, as described above. The bank may initiate additional authentication steps, depending on the customer relationship with the bank, the location of the customer when making the deposit, and so forth, so that the bank is satisfied that the cash deposit is not fraudulent.

In some embodiments, once the bank customer makes the cash deposit request from the mobile device, the mobile app obfuscates the barcode such that the barcode is not readable by a barcode reader. The mobile app includes an option, such as a selectable button on the mobile app interface screen, that enables the barcode to be revealed. The selectable button may, for example, say, "reveal barcode". The bank customer thus makes this selection once she is in the presence of the merchant with which the cash deposit is to be made. The idea is to avoid allowing a nefarious third party to take a photo of the barcode and then use the barcode for fraudulent purposes. Further, in some embodiments, the barcode is automatically rotated every predetermined time period (e.g., 30 seconds) or every time the bank customer selects the "reveal barcode" option as well as once the barcode is scanned by the merchant. In some embodiments, the barcode is automatically invalidated if a screenshot is taken of the barcode. Again, this is to prevent the barcode from being sent to a nefarious actor. Other actions to prevent the barcode from being duplicated in any way may also be taken by the bank.

Recall that the machine learning 114 is performed at the bank server 108 and includes behavioral and historical information 124 about the bank customer (FIG. 1). In some embodiments, behavioral and historical information 124 includes device location and location history, user account size, user deposit history, upcoming bills. As used herein, upcoming bills are bills due to be paid from the bank account within a predetermined time period. In some embodiments, the predetermined time period is less than two weeks. For example, an upcoming bill for $4,000 may cause the deposit limit calculator 110 to allow a deposit limit of greater than $4,000 if the account was deemed safe based on deposit history or funds availability. As another example, a user with $250,000 in deposits and regular deposit behavior of $5,000 in cash on Fridays at 5 PM may result in the deposit limit calculator 110 allowing a deposit threshold of $5,000 at that time at a certain deposit location instead of a default deposit threshold $1,000 that the bank applies.

In some embodiments, the predetermined time period is customer-specific, and based on behavior known to the bank. So, for example, if a bank customer is known to always pay bills exactly one day before they are due, that customer's predetermined time period would be set by the bank as one day. If a second bank customer always pays bills three weeks before they are due, the second bank customer would have a predetermined time period set to three weeks.

In some embodiments, for bank customers with satisfactory account history, deposit limits are proactively raised based on incoming payment dates and balance amounts, especially for auto loans and credit card bills. In some embodiments, these factors are fed into the machine learning unit 114, consisting of both micro- and macro-machine learning algorithms. Micro-machine learning involves analysis of the behavior of each customer individually. Thus, the predetermined time period example above is an example of micro-machine learning. Macro-machine learning involves an aggregate analysis of all customer behavior. The machine learning 114 then determines, on a user and collective basis, appropriate and distinct deposit limits for each bank customer.

Figure 3:
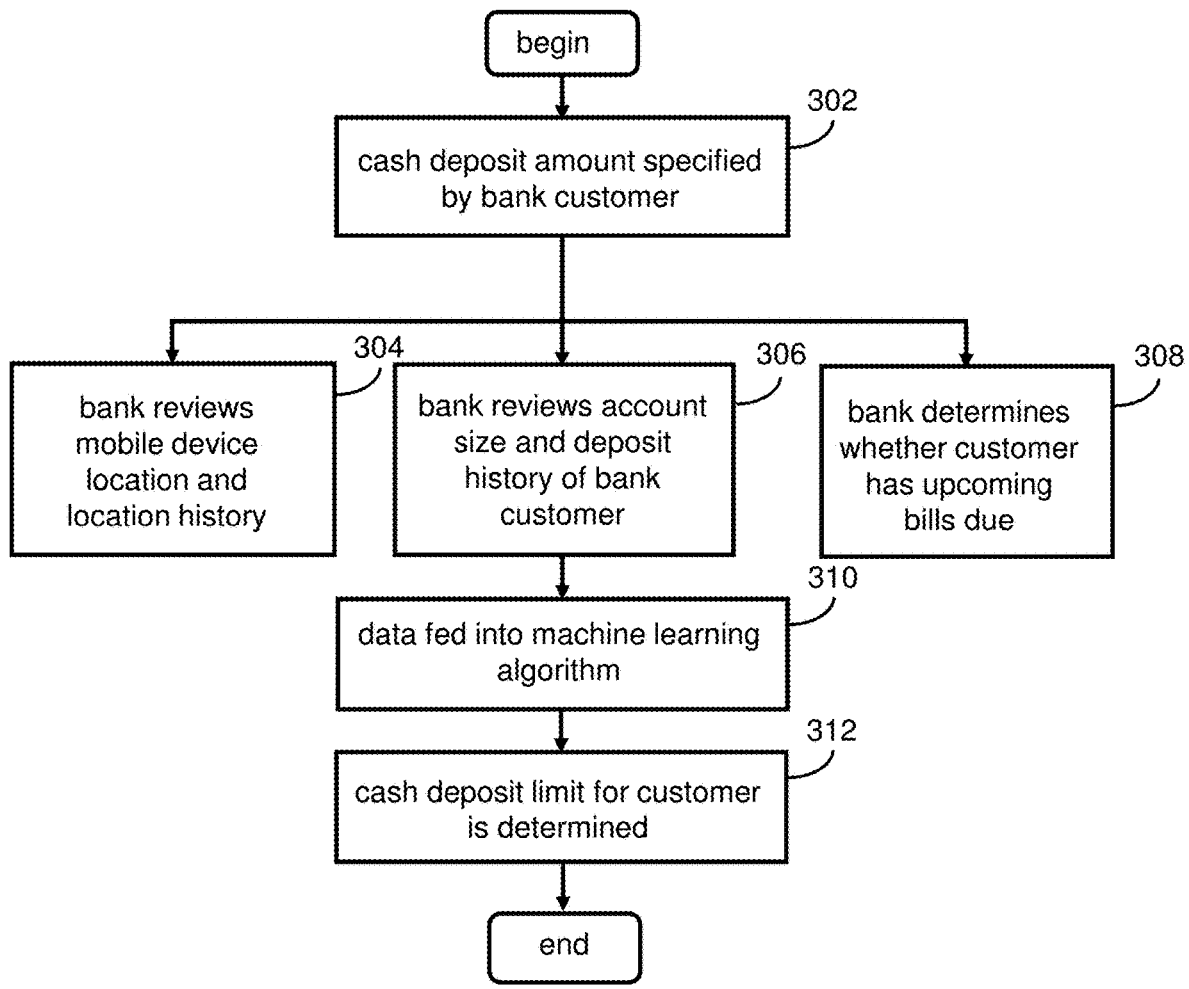
FIG. 3 is a flow diagram illustrating how machine learning is used to determine a cash deposit limit for the bank customer in real-time by the cash deposit digitization of FIGS. 1 and 2, according to some embodiments.

FIG. 3 is a flow diagram 300 illustrating how machine learning is used to determine a cash deposit limit for the bank customer in real-time by the cash deposit digitization system 100 and method 200, according to some embodiments. The operations 300 are performed by the deposit limit calculator 112, specifically, the machine learning unit 114 (FIG. 1). The cash deposit amount is specified by the bank customer (block 302). Next, different types of behavioral and historical information 124 of the bank customer are gathered. At the bank server, the bank reviews the location of the bank customer's mobile device as well as any information the bank has about where the mobile device has been in the past (block 304). The bank's Location Services feature of their mobile bank app would facilitate this review. Other sensors may be available to the bank as well, such as facial recognition at some locations, card scanners that are used in work locations, and even implanted in individuals. The bank may want to limit large cash deposits made from some locations abroad, for example, especially if the bank customer is not known by the bank have before engaged in transactions abroad.

In some embodiments, the bank also reviews the size of the bank customer's account and the deposit history on the account that are known to the bank (block 306). While the cash deposit history of a customer is interesting to the bank, a customer's total history may also be relevant. A bank customer with a long relationship with the bank and a better risk model score may be rewarded with higher daily deposit limits, for example, as would one who maintains a sizeable account, say of $100,000 or more. The bank also determines whether the customer has upcoming bills due (block 308). Once some or all of the behavioral and historical information 124 known to the bank are obtained, the data is fed into a machine learning algorithm 310 (block 310). Based on the results of the machine learning, the cash deposit limit for the bank customer is determined (block 312). Thus, the bank customer is given a real-time deposit limit, which controls whether the customer will proceed with the cash deposit.

Figure 4:
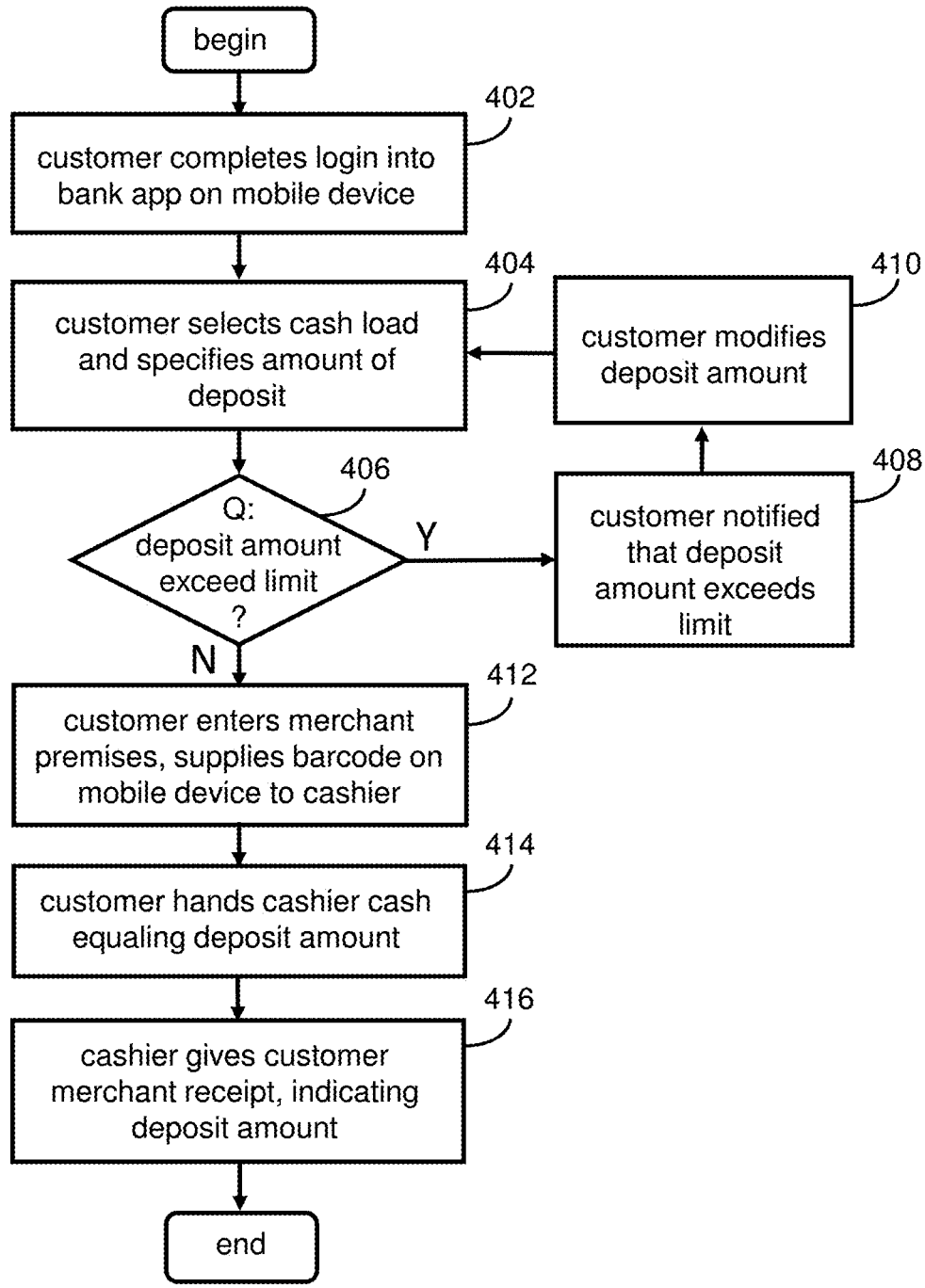
FIG. 4 is a flow diagram showing the cash deposit digitization from the customer perspective, according to some embodiments.

FIG. 4 is a flow diagram 400 showing the cash deposit digitization operations from the customer perspective, according to some embodiments. The bank customer logs into the bank app on a hand-held device, such as a smartphone or tablet having Internet access (block 402). The customer selects an option to deposit cash at a qualifying merchant, known as "cash load", and specifies the amount of the deposit (block 404). Once the cash deposit amount is specified, the bank server will be calculating the cash deposit limit for the bank customer. If the cash deposit amount exceeds the real-time customer limit (block 406), the customer is so notified (block 408), such as an indicator on the bank app of her hand-held device. The bank customer then has the option to change the cash deposit amount (block 410). Since the bank has informed the customer of her new cash deposit limit, she will likely specify a cash deposit amount within her limit.

Once the cash deposit amount meets the threshold, the customer is able to enter the premises of a bank-approved merchant supporting cash deposits and present the barcode on her mobile device to the cashier (block 412), which the cashier will scan. The bank customer also gives the cashier the cash to be deposited into her bank account, with the amount given being the same as the amount indicated when scanning the barcode (block 414). Upon receipt of both the barcode and the cash, the cashier will provide the bank customer with a receipt, whether in electronic or paper form, indicating the amount of the deposit (block 416).

At some point, the customer will be able to review her bank account information and see the cash deposit as a credit to her account. If the deposit is not indicated after a certain time, she has the cash receipt that she may provide to her bank, so that she may recover those funds.

Figure 5:
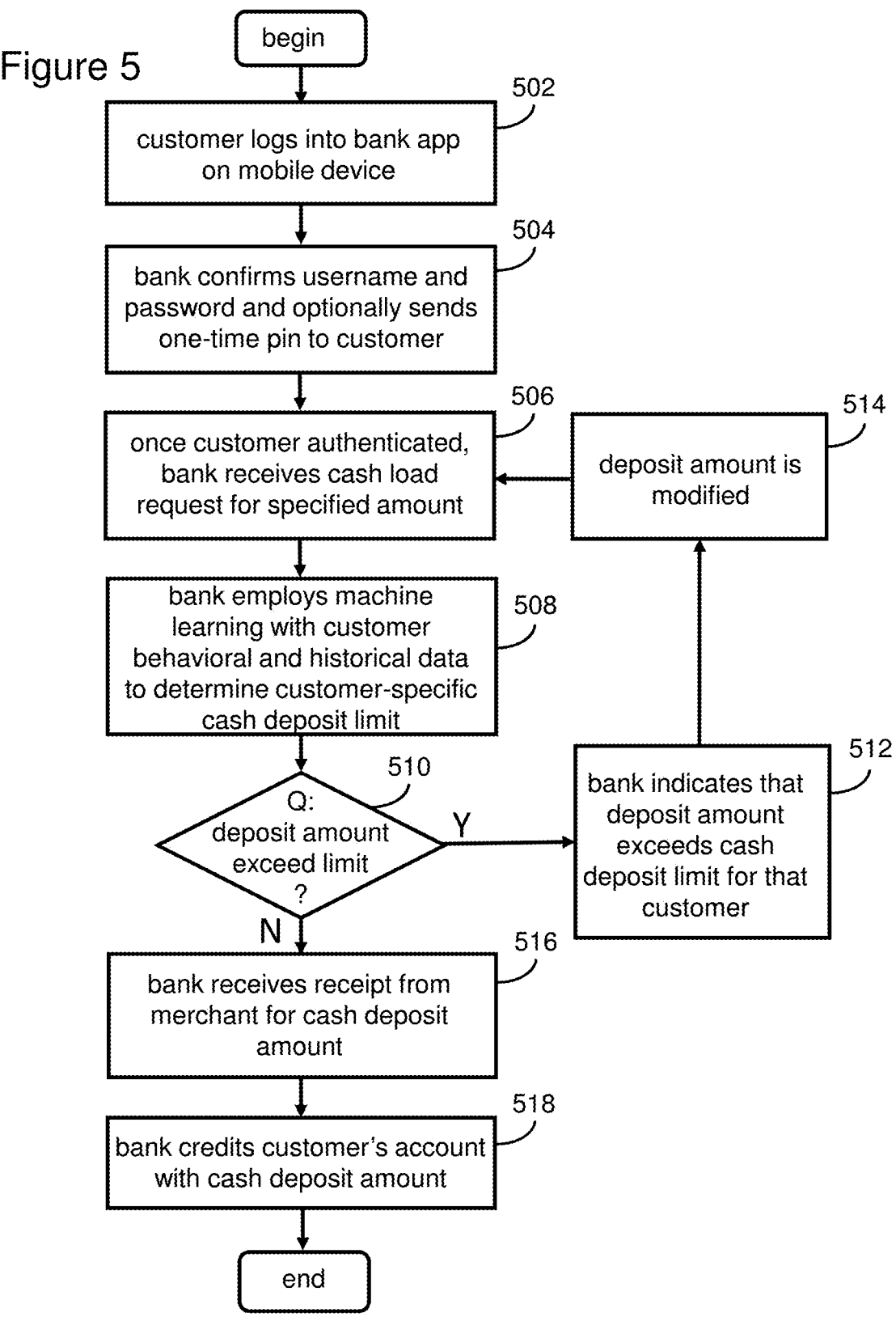
FIG. 5 is a flow diagram showing the cash deposit digitization operations from the bank perspective, according to some embodiments.

FIG. 5 is a flow diagram 500 showing the cash deposit digitization operations from the bank perspective, according to some embodiments. The operations of the bank commence once the customer logs into the bank app on the mobile device (block 502). The bank confirms that the username and password entered are correct, and also optionally sends a one-time pin to the customer for further verification (block 504). Once the bank customer is authenticated, the user will have specified in the bank app a request to deposit cash at a bank-approved merchant supporting cash deposits, the amount of which is received by the bank (block 506). The bank employs machine learning, which includes customer behavioral and historical data, to determine a customer-specific and at-the-moment cash deposit limit (block 508). If the cash deposit request exceeds the cash deposit limit (block 510), the bank customer will be so informed by the bank (block 512).

At this point, it is presumed that the bank customer changes the cash deposit request to meet the cash deposit threshold, receives the barcode for the transaction, enters the merchant premises, and makes the cash deposit. The bank receives a receipt for the cash deposit transaction from the merchant (block 516). Finally, the bank updates the bank customer's account to reflect the cash deposit as a credit (block 518). The operations 500 to enable a bank customer to make a cash deposit at a bank-approved merchant, where the cash deposit will be made into the bank customer's account, are thus complete.

Figure 6:
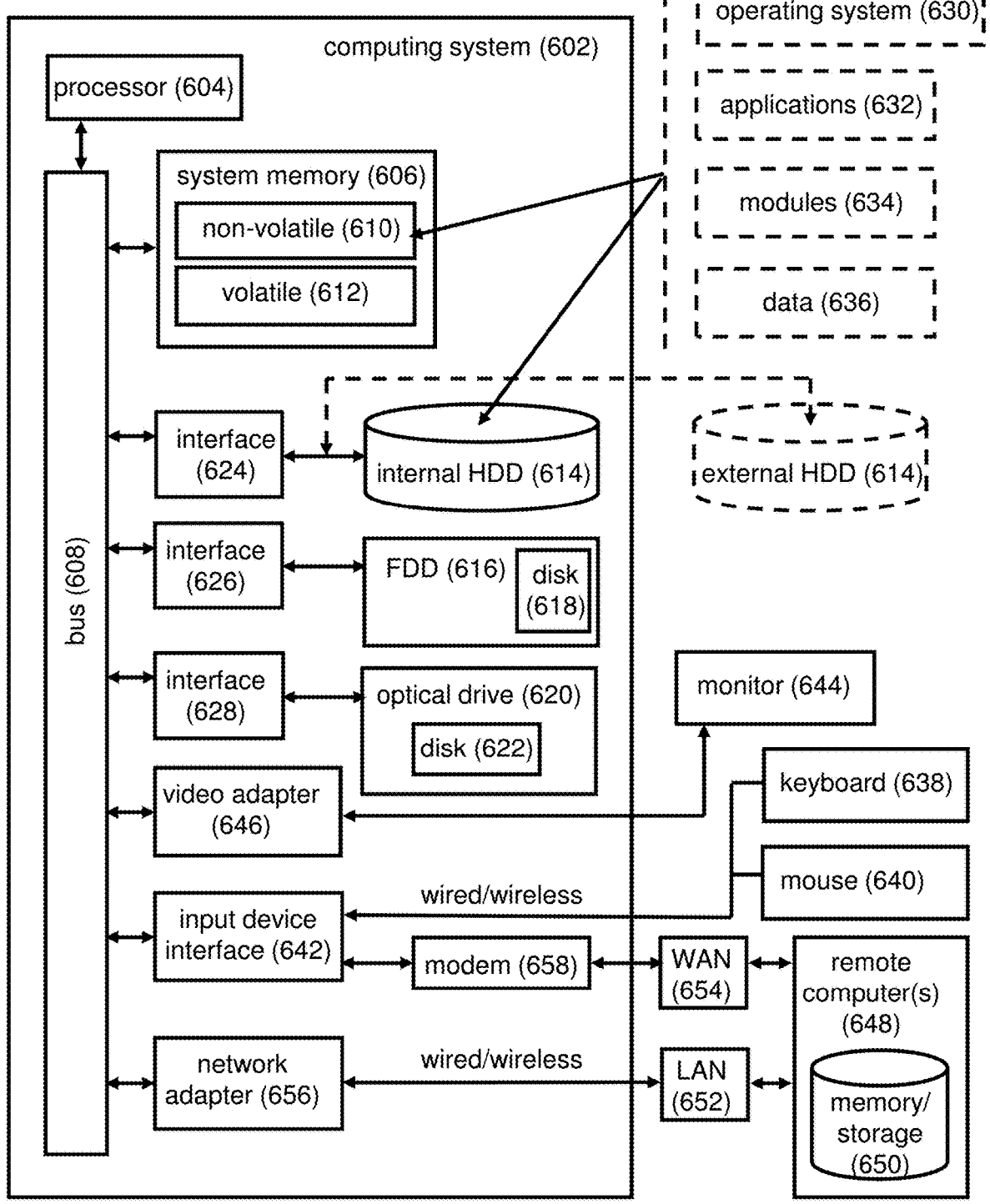
FIG. 6 is an illustration of an exemplary computing architecture for implementing the cash deposit digitization of FIGS. 1 and 2, according to some embodiments.

FIG. 6 illustrates an embodiment of an exemplary computing architecture 600 comprising a computing system 602 that may be suitable for implementing various embodiments as previously described. In various embodiments, the computing architecture 600 may comprise or be implemented as part of an electronic device. In some embodiments, the computing architecture 600 may be representative, for example, of a system that implements one or more components of the cash deposit digitization system 100 and method 200. In some embodiments, computing system 602 may be representative, for example, of the mobile devices used in implementing the cash deposit digitization system 100 and method 200. The embodiments are not limited in this context. More generally, the computing architecture 600 is configured to implement all logic, applications, systems, methods, apparatuses, and functionality described herein.

As used in this application, the terms "system" and "component" and "module" are intended to refer to a computer-related entity, either hardware, a combination of hardware and software, software, or software in execution, examples of which are provided by the exemplary computing architecture 600. For example, a component may be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server may be a component. One or more components may reside within a process and/or thread of execution, and a component may be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information may be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 602 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 602.

As shown in FIG. 6, the computing system 602 comprises a processor 604, a system memory 606 and a system bus 608. The processor 604 may be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi-processor architectures may also be employed as the processor 604.

The system bus 608 provides an interface for system components including, but not limited to, the system memory 606 to the processor 604. The system bus 608 may be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 is not a propagating signal divorced from the underlying hardware of the computing system 602 and is thus non-transitory. The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 may include non-volatile memory 610 and/or volatile memory 612. A basic input/output system (BIOS) may be stored in the non-volatile memory 610.

The computing system 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 may be connected to the system bus 608 by an HDD interface 624, an FDD interface 626 and an optical drive interface 628, respectively. The HDD interface 624 for external drive implementations may include at least one or both of Universal Serial Bus (USB) and IEEE 1394 interface technologies. The computing system 602 is generally is configured to implement all logic, systems, methods, apparatuses, and functionality described herein with reference to FIGS. 1-5.

The drives and associated computer-readable media provide volatile and/or nonvolatile storage of data, data structures, computer-executable instructions, and so forth. For example, a number of program modules may be stored in the drives and memory units 610, 612, including an operating system 630, one or more application programs 632, other program modules 634, and program data 636. In one embodiment, the one or more application programs 632, other program modules 634, and program data 636 may include, for example, the various applications and/or components of the cash deposit digitization system 100, e.g., the bank app 104.

A user may enter commands and information into the computing system 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 604 through an input device interface 642 that is coupled to the system bus 608, but may be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computing system 602. In addition to the monitor 644, a computer typically includes other peripheral output devices, such as speakers, printers, and so forth.

The computing system 602 may operate in a networked environment using logical connections via wire and/or wireless communications to one or more remote computers, such as a remote computer 648. The remote computer 648 may be a workstation, a server computer, a router, a personal computer, portable computer, microprocessor-based entertainment appliance, a peer device or other common network node, and typically includes many or all of the elements described relative to the computing system 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computing system 602 is connected to the LAN 652 through a wire and/or wireless communication network interface or adaptor 656. The adaptor 656 may facilitate wire and/or wireless communications to the LAN 652, which may also include a wireless access point disposed thereon for communicating with the wireless functionality of the adaptor 656.

When used in a WAN networking environment, the computing system 602 may include a modem 658, or is connected to a communications server on the WAN 654 or has other means for establishing communications over the WAN 654, such as by way of the Internet. The modem 658, which may be internal or external and a wire and/or wireless device, connects to the system bus 608 via the input device interface 642. In a networked environment, program modules depicted relative to the computing system 602, or portions thereof, may be stored in the remote memory/storage device 650. It will be appreciated that the network connections shown are exemplary and other means of establishing a communications link between the computers may be used.

The computing system 602 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication may be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network may be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operation in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A mobile device, comprising:
a processor; and a memory coupled to the processor, the memory comprising instructions that, when executed by the processor, cause the processor to:
receive an amount of a cash deposit for an account;
analyze behavioral and historical data associated with the account to determine a cash limit for the account; and
in response to the amount not exceeding the cash limit, generate a scannable barcode to be displayed on the mobile device, wherein the amount is embedded in the scannable barcode.

2. The mobile device of claim 1, the memory comprising instructions that, when executed by the processor, cause the processor to:
authenticate a username and a password received for the account.

3. The mobile device of claim 1, the memory comprising instructions that, when executed by the processor, cause the processor to:
obfuscate the barcode displayed on the mobile device; and
reveal the barcode responsive to receiving input specifying to reveal the barcode.

4. The mobile device of claim 1, the memory comprising instructions that, when executed by the processor, cause the processor to:
determine that a screenshot of the mobile device is captured during display of the barcode; and
invalidate the barcode based on the determination that the screenshot of the mobile device was captured during display of the barcode.

5. The mobile device of claim 1, wherein a machine learning algorithm determines the cash limit based on the behavioral and historical data associated with the account.

6. The mobile device of claim 1, the memory comprising instructions that, when executed by the processor, cause the processor to:
receive a second amount of a second cash deposit for the account;
analyze the behavioral and historical data associated with the account to determine an updated cash limit for the account; and
in response to the second amount exceeding the updated cash limit, display a message indicating that the second amount exceeds the updated cash limit.

7. The mobile device of claim 1, the memory comprising instructions that, when executed by the processor, cause the processor to:
receive a receipt indicating that the cash deposit was made at a merchant premises based on a scan of the barcode by a scanning device at the merchant premises.

8. A non-transitory computer-readable storage medium comprising instructions that, when executed by a processor, cause the processor to:
receive an amount of a cash deposit for an account;
analyze behavioral and historical data associated with the account to determine a cash limit for the account; and
in response to the amount not exceeding the cash limit, generate a scannable barcode to be displayed on a display coupled to the processor, wherein the amount is embedded in the scannable barcode.

9. The computer-readable storage medium of claim 8, comprising instructions that, when executed by the processor, cause the processor to:
authenticate a username and a password received for the account.

10. The computer-readable storage medium of claim 8, comprising instructions that, when executed by the processor, cause the processor to:
obfuscate the barcode displayed on the display; and
reveal the barcode responsive to receiving input specifying to reveal the barcode.

11. The computer-readable storage medium of claim 8, comprising instructions that, when executed by the processor, cause the processor to:
determine that a screenshot depicting the barcode has been captured; and
invalidate the barcode based on the determination that the screenshot was captured.

12. The computer-readable storage medium of claim 8, wherein a machine learning algorithm determines the cash limit based on the behavioral and historical data associated with the account.

13. The computer-readable storage medium of claim 8, comprising instructions that, when executed by the processor, cause the processor to:
receive a second amount of a second cash deposit for the account;
analyze the behavioral and historical data associated with the account to determine an updated cash limit for the account; and
in response to the second amount exceeding the updated cash limit, display a message indicating that the second amount exceeds the updated cash limit.

14. The computer-readable storage medium of claim 8, comprising instructions that, when executed by the processor, cause the processor to:
receive a receipt indicating that the cash deposit was made at a merchant premises based on a scan of the barcode by a scanning device at the merchant premises.

15. A method, comprising:
receiving, by an application executing on a processor of a mobile device, an amount of a cash deposit for an account;
analyzing, by the application, behavioral and historical data associated with the account to determine a cash limit for the account; and
in response to the amount not exceeding the cash limit, generating, by the application, a scannable barcode to be displayed on the mobile device, wherein the amount is embedded in the scannable barcode.

16. The method of claim 15, wherein a machine learning algorithm determines the cash limit based on the behavioral and historical data associated with the account, the method further comprising:
authenticating, by the application, a username and a password received for the account.

17. The method of claim 15, further comprising:
obfuscating, by the application, the barcode displayed on the mobile device; and
revealing the barcode by the application responsive to receiving input specifying to reveal the barcode.

18. The method of claim 15, further comprising:
determining, by the application, that a screenshot of the mobile device is captured during display of the barcode; and
invalidating, by the application, the barcode based on the determination that the screenshot of the mobile device was captured during display of the barcode.

19. The method of claim 15, further comprising:
receiving, by the application, a second amount of a second cash deposit for the account;

analyzing, by the application, the behavioral and historical data associated with the account to determine an updated cash limit for the account; and in response to the second amount exceeding the updated cash limit, displaying, by the application, a message indicating that the second amount exceeds the updated cash limit.

20. The method of claim 15, further comprising:

receiving, by the application, a receipt indicating that the cash deposit was made at a merchant premises based on a scan of the barcode by a scanning device at the merchant premises.

\* \* \* \* \*